(12) United States Patent
Scheu

(10) Patent No.: US 9,079,358 B2
(45) Date of Patent: Jul. 14, 2015

(54) ROUND SONOTRODE

(71) Applicant: MS Spaichingen GmbH, Spaichingen (DE)

(72) Inventor: Jochen Scheu, Villingen-Schwenningen (DE)

(73) Assignee: MS Spaichingen GmbH, Spaichingen (DE)

( * ) Notice: Subject to any disclaimer, the term of this patent is extended or adjusted under 35 U.S.C. 154(b) by 0 days.

(21) Appl. No.: 14/185,318

(22) Filed: Feb. 20, 2014

(65) Prior Publication Data
US 2014/0231020 A1  Aug. 21, 2014

(30) Foreign Application Priority Data

Feb. 20, 2013  (DE) .......................... 10 2013 202 766

(51) Int. Cl.
*B32B 37/00* (2006.01)
*B29C 65/08* (2006.01)
*B29C 65/00* (2006.01)
*B65B 61/18* (2006.01)
*B29C 65/78* (2006.01)

(52) U.S. Cl.
CPC ............. *B29C 65/08* (2013.01); *B29C 65/7811* (2013.01); *B29C 65/7841* (2013.01); *B29C 66/112* (2013.01); *B29C 66/131* (2013.01); *B29C 66/24221* (2013.01); *B29C 66/8161* (2013.01); *B29C 66/81431* (2013.01); *B65B 61/186* (2013.01); *B29C 65/7802* (2013.01); *B29C 66/24245* (2013.01); *B29C 66/47421* (2013.01); *B29C 66/81433* (2013.01); *B29C 66/81435* (2013.01); *B29C 66/8242* (2013.01); *B29C 66/8746* (2013.01); *B31B 2201/9085* (2013.01); *B31B 2219/603* (2013.01)

(58) Field of Classification Search
CPC  B29C 65/08; B29C 65/7811; B29C 65/7841; B29C 66/81431; B29C 35/0261
USPC .................. 156/73.1, 359, 378, 580.1, 580.2
See application file for complete search history.

(56) References Cited

U.S. PATENT DOCUMENTS 4,063,990 A * 12/1977 Volz et al. ................. 156/580.2
5,058,360 A * 10/1991 Yamazaki et al. ............ 53/133.2
5,244,520 A *  9/1993 Gordon et al. ............... 156/73.1

(Continued)

FOREIGN PATENT DOCUMENTS

DE       1479724      3/1969
DE     103 23 600    12/2004

(Continued)

OTHER PUBLICATIONS

European Search Report for European Application No. 14 155 198.6 (Jun. 4, 2014).

(Continued)

*Primary Examiner* — James Sells
(74) *Attorney, Agent, or Firm* — Mintz Levin Cohn Ferris Glovsky and Popeo, P.C.; Peter F. Corless; Steven M. Jensen

(57) ABSTRACT

A round sonotrode has a sonotrode body which has a receiving space for a workpiece at its front end. The receiving space is surrounded by an annular web which has a weld surface at its front end face. A workpiece holder is furthermore provided in the receiving space.

15 Claims, 2 Drawing Sheets

(56) References Cited

U.S. PATENT DOCUMENTS

Figure 1:
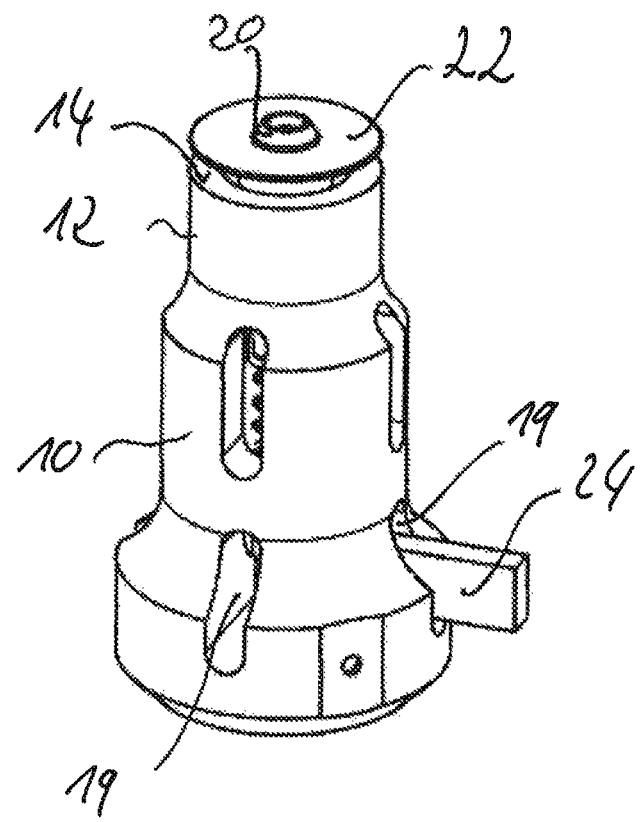

| | | | |
|---|---|---|---|
| 5,690,764 A * | 11/1997 | Dirksing et al. | 156/69 |
| 5,922,170 A * | 7/1999 | Gerdes et al. | 156/580.2 |
| 7,204,289 B2 * | 4/2007 | Hickman et al. | 156/581 |

FOREIGN PATENT DOCUMENTS

| | | |
|---|---|---|
| DE | 10 2010 003 268 | 9/2011 |
| EP | 0 450 146 | 10/1991 |
| JP | 63-149283 | 9/1988 |
| JP | 63-188126 | 12/1988 |
| JP | 04-525 | 1/1992 |
| JP | 06-344474 | 12/1994 |
| JP | 11-235767 | 8/1999 |
| JP | 2002-127254 | 5/2002 |

OTHER PUBLICATIONS

German Search Report (with English-language translation) for German Application No. 10 2013 202 766.4 (dated Dec. 5, 2013).

* cited by examiner

ROUND SONOTRODE

CROSS-REFERENCES TO RELATED APPLICATIONS

This application claims under 35 U.S.C. §119 the benefit of German Application No. 10 2013 202 766.4, filed Feb. 20, 2013, the entire contents of which are incorporated herein by reference in its entirety.

The present invention relates to a round sonotrode which comprises a sonotrode body which has a receiving space for a workpiece at its front end, wherein the receiving space is surrounded by an annular web which has a weld surface at its front end face.

Such a round sonotrode is, for example, known from DE 10 2010 003 268 A1 and there serves for the ultrasonic welding of a plastic closure to a tubular bag.

It is the object of the present invention to further develop a round sonotrode in accordance with the preamble of claim 1 such that an improved positioning of the workpiece is possible with it.

This object is satisfied by the features of claim 1 and in particular in that a workpiece holder is provided in the receiving space. In accordance with the invention, the sonotrode thus does not only serve for the welding of the workpiece to a mating surface. The workpiece itself can rather be held or supported within the receiving space using the round sonotrode in accordance with the invention such that the workpiece adopts a reproducible, exact position on the initiation of the welding process. It is ensured in this manner that a wanted desired position for the workpiece is also adopted in automated production operation on placing the workpiece onto a mating surface.

Advantageous embodiments of the invention are described in the description, in the drawing and in the dependent claims.

In accordance with a first advantageous embodiment, the workpiece holder can have a centering mandrel. On the one hand, a workpiece can hereby be placed onto the workpiece holder in an automated manner. On the other hand, the positioning of the workpiece at the wanted desired position can be facilitated with the aid of the centering mandrel.

In accordance with a further advantageous embodiment, the centering mandrel can in particular be movable relative to the sonotrode body, in particular in a linear travel movement against a restoring force, for example a spring, a gas compression spring or a pneumatic cylinder. The sonotrode with the integrated workpiece holder and a workpiece located thereon can hereby be set at a mating surface, with the workpiece being pressed toward the mating surface by the restoring force before the start of the welding process; however, without a contact already taking place between the weld surface and the workpiece.

In accordance with a further advantageous embodiment, a sensor can be integrated into the round sonotrode which sensor detects the presence of a workpiece and/or a correct orientation of the workpiece at the workpiece holder. This allows an automated monitoring of the welding process, with it simultaneously being ensured that the workpiece is located in the wanted desired position at the start of the welding process.

It can furthermore be advantageous if the workpiece holder has a mechanical coding element such as a projection or a recess with which a correct orientation of a workpiece at the workpiece holder is ensured.

In accordance with a further advantageous embodiment of the invention, the sonotrode body can have at least one cut-out which connects its outer jacket surface to the receiving space. Such a cut-out can be configured, for example, in the form of an elongated hole which allows a correct vibration of the sonotrode. In accordance with the invention, a holding element of the workpiece holder can be led through the cut-out in this embodiment. It is ensured in this way that the actual sonotrode body, which is set into mechanical vibration in the welding process, is not in contact with the workpiece holder. The holding element, which is led through the cut-out, can rather be fastened to a component which does not vibrate, whereby a vibration-decoupled support of the workpiece holder relative to the sonotrode body is realized. A vibration of the sonotrode body thus does not influence the position of the workpiece holder.

The cut-out for the leading through of a holding element of the workpiece holder can have either a closed peripheral contour or a peripheral contour open toward the weld surface. It is furthermore possible to provide the cut-out in a base of the round sonotrode so that the holding element projects into the sonotrode from below.

In accordance with a further embodiment of the invention, sonotrode needles, sonotrode pins or sonotrode projections can be provided at the weld surface which are in particular arranged in two, three or four rings, preferably concentric rings. In this manner, the desired welding energy can be introduced into the workpiece point by point along the entire periphery of the workpiece so that high removal values are obtained after the welding. The sonotrode needles can, for example, be configured as tooth-shaped, conical or cylindrical elevated portions.

In accordance with a further advantageous embodiment, the sonotrode body can be configured as a hollow cylinder over at least 50% of its longitudinal extent. Good weld results are hereby possible, on the one hand. On the other hand, the inner space of the hollow cylinder can be used for receiving the workpiece holder.

In accordance with a further advantageous embodiment, a clamping element can be provided at the workpiece holder and a workpiece can be temporarily fixed with it. It can in this way be prevented that, on an automated production, a workpiece accidentally falls out of the workpiece holder when the sonotrode is moved—for example with the aid of a manipulator.

Figures 2, 3:
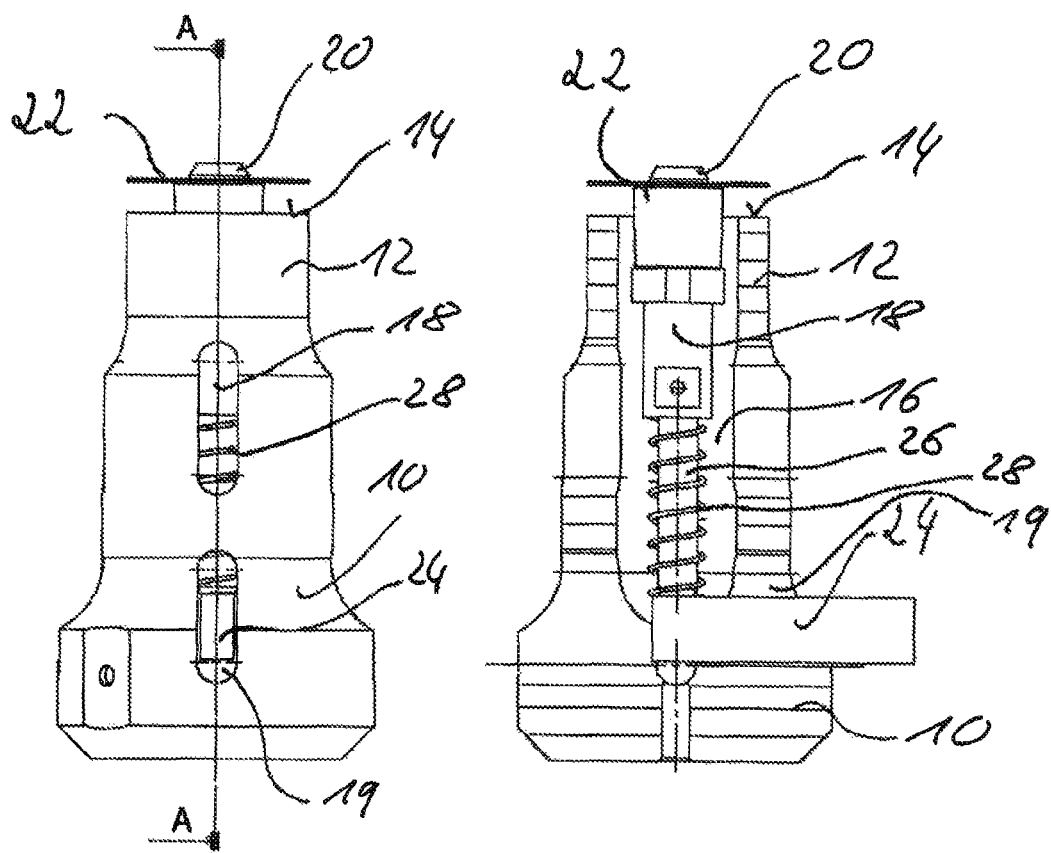

The present invention will be described in the following purely by way of example with reference to an advantageous embodiment and to the enclosed drawings. There are shown:

FIG. 1 a perspective view of a round sonotrode;

FIG. 2 a side view of the sonotrode of FIG. 1; and

FIG. 3 a section through the sonotrode of FIG. 1 and FIG. 2 along the line A-A of FIG. 2.

The round sonotrode shown in FIGS. 1 to 3 has a generally rotationally symmetrical sonotrode body 10 which ends at its front end in an annular web 12 which forms a weld surface 14 at its front end face. The weld surface 14 forms an annular strip in a plan view and can be provided in accordance with an embodiment not shown in the Figures over its whole surface with sonotrode needles which are arranged in two, three or also four rings, in particular concentric rings.

As in particular FIG. 3 illustrates, the sonotrode body 10 is configured as hollow cylindrical over approximately 80% of its longitudinal extent so that a receiving space 16 which extends in the longitudinal extent of the round sonotrode up to the weld surface 14 is formed in the interior of the sonotrode body 10. In accordance with the invention, a workpiece holder 18 is in this respect provided in the receiving space 16.

At its front end, the workpiece holder 18 has a centering mandrel 20 which extends beyond the front end of the sonotrode body 10 and is placed onto a workpiece 22 which, in the embodiment shown, is a component which comprises a hollow cylinder having an annular disk molded thereat. In this respect, other workpiece shapes are naturally also possible such as a hollow cylinder with a plate in square shape molded thereat.

As FIG. 3 furthermore illustrates, the workpiece holder 18 comprises a holding element 24 which is led through one of a plurality of cut-outs 19 in the sonotrode body 10 which connect its outer jacket surface to the receiving space 16. In this respect, in the embodiment shown, a respective four cut-outs are provided both at the middle and in the rear end of the sonotrode body 10 which are distributed evenly over the periphery, which have a closed outer contour and which allow a correct vibration of the sonotrode body. Alternatively, more or fewer cut-outs can also be provided, for example two or six cut-outs. In the embodiment shown, the holding element 24 is only led out of the receiving space 16 through one of the rear cut-outs. It would, however, also be possible to lead the holding element 24 through another cu-tout or to lead a plurality of holding elements through a plurality of cut-outs. In all cases, however, there is no contact between the sonotrode body 10 and the holding element 24 or the workpiece holder 18.

As FIG. 3 illustrates, a holding bar 26 is fastened to the holding element 24 which in the embodiment shown is configured as a bar having a rectangular cross-section. In this respect, the centering mandrel 20 is movable in the axial direction relative to the sonotrode body 10 or relative to the holding bar 26 against the force of a spring 28.

If a workpiece 22 is to be welded to a mating surface using the above-described round sonotrode, the workpiece 22 is first set onto the centering mandrel 20, either manually or in automated fashion, with a mechanical coding element, not shown, in the form of at least one projection or the like ensuring a correct orientation of the workpiece at the workpiece holder 18.

When the workpiece 22 is then located in the desired position at the workpiece holder 18 (cf. FIG. 1 to FIG. 3), the round sonotrode with the workpiece located thereon can be set at a mating surface which has a circular opening so that the centering mandrel 20 can be introduced into the opening. When the annular disk of the workpiece 22 then contacts the mating surface and the sonotrode is moved further in the direction of the mating surface, the centering mandrel 20 is moved relative to the sonotrode body 12 in the direction of the rear end of the round sonotrode against the force of the spring 28 until the intermediate space between the annular disk of the workpiece 22 and the weld surface 14 has reduced down to zero so that the weld surface 14 contacts the annular disk of the workpiece 22 over the full area along its total periphery. Energy can subsequently be introduced by applying ultrasound so that the workpiece and the mating surface heat up and can be welded to one another. After a retraction of the round sonotrode, another welding process can subsequently be started.

The invention claimed is:

1. A round sonotrode, comprising:
a sonotrode body having a front end and a receiving space for a workpiece at the front end, the receiving space being surrounded by an annular web, the annular web having a front end face and a weld surface at the front end face, with a workpiece holder being provided in the receiving space,
wherein the sonotrode body has at least one cut-out which connects an outer jacket surface of the sonotrode body to the receiving space, and
a holding element of the workpiece holder is led through the cut-out.

2. The round sonotrode in accordance with claim 1, wherein the workpiece holder has a centering mandrel.

3. The round sonotrode in accordance with claim 2, wherein the centering mandrel is movable relative to the sonotrode body against a restoring force.

4. The round sonotrode in accordance with claim 3, wherein the restoring force is provided by one of a spring and a pneumatic cylinder.

5. The round sonotrode in accordance with claim 1, wherein a sensor is integrated therein which detects at least one of a presence of a workpiece at the workpiece holder and a correct orientation of a workpiece at the workpiece holder.

6. The round sonotrode in accordance with claim 1, wherein the workpiece holder has a mechanical coding element which ensures a correct orientation of a workpiece at the workpiece holder.

7. The round sonotrode in accordance with claim 1, wherein the cut-out has a closed outer contour.

8. The round sonotrode in accordance with claim 1, wherein the cut-out has an outer contour open toward the weld surface.

9. The round sonotrode in accordance with claim 1, wherein the cut-out is provided in a base of the round sonotrode.

10. The round sonotrode in accordance with claim 1, wherein the workpiece holder is supported in a vibration-decoupled manner relative to the sonotrode body.

11. The round sonotrode in accordance with claim 1, wherein the weld surface comprises members selected from the group consisting of: sonotrode needles, sonotrode pins, and sonotrode projections.

12. The round sonotrode in accordance with claim 11, wherein the members are arranged in two to four rings.

13. The sonotrode in accordance with claim 12, wherein the members are arranged in two to fourconcentric rings.

14. The round sonotrode in accordance with claim 1, wherein the sonotrode body is hollow cylindrical over at least 50% of its longitudinal extent.

15. The round sonotrode in accordance with claim 1, wherein a clamping element with which a workpiece can be temporarily fixed is provided at the workpiece holder.

* * * * *